United States Patent
London

(10) Patent No.: US 11,200,511 B1
(45) Date of Patent: Dec. 14, 2021

(54) ADAPTIVE SAMPLING OF TRAINING DATA FOR MACHINE LEARNING MODELS BASED ON PAC-BAYES ANALYSIS OF RISK BOUNDS

(71) Applicant: Amazon Technologies, Inc., Seattle, WA (US)

(72) Inventor: Benjamin Alexei London, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1061 days.

(21) Appl. No.: 15/817,068

(22) Filed: Nov. 17, 2017

(51) Int. Cl.
*G06N 20/00* (2019.01)
*G06N 7/08* (2006.01)
*G06N 7/00* (2006.01)

(52) U.S. Cl.
CPC .............. *G06N 20/00* (2019.01); *G06N 7/005* (2013.01); *G06N 7/08* (2013.01)

(58) Field of Classification Search
CPC ........... G06N 7/08; G06N 20/00; G06N 7/005
See application file for complete search history.

(56) References Cited

U.S. PATENT DOCUMENTS 9,129,228 B1 * 9/2015 Szegedy ................ G06N 20/00
2003/0018615 A1 * 1/2003 Chaudhuri .......... G06F 16/2462
2015/0379430 A1 * 12/2015 Dirac ..................... G06N 20/00
706/12

OTHER PUBLICATIONS

Germain, Pascal, et al. "PAC-Bayesian learning of linear classifiers." Proceedings of the 26th Annual International Conference on Machine Learning. (Year: 2009).*
Andre Elisseeff, et al., "Stability of Randomized Learning Algorithms", Journal of Machine Learning Research 6, 2005, pp. 55-79.
Areyh Kontorovich, "Concentration in unbounded metric spaces and algorithmic stability", Proceeding of the 31st International Conference on Machine Learning, 2014, pp. 1-9.
Alex Krizhevsky, "Learning Multiple Layers of Features from Tiny Images", Technical Report, 2009, pp. 1-60.
Adam Smith, "Differentially Private Feature Selection via Stability Arguments, and the Robustness of the Lasso", Conference on Learning Theory, Jun. 2013, pp. 819-850.
Ben London, "Stability and Generalization in Structured Prediction", Journal of Machine Learning Research 7, 2016, pp. 1-52.
Colin McDiarmid, "On the Method of Bounded Differences", Surveys in combinatorics, 1989, pp. 148-188.

(Continued)

*Primary Examiner* — Alexey Shmatov
*Assistant Examiner* — Ahsif A. Sheikh
(74) *Attorney, Agent, or Firm* — Robert C. Kowert; Kowert, Hood, Munyon, Rankin & Goetzel, P.C.

(57) ABSTRACT

At a machine learning service, an indication of a training data set for a model is obtained. One or more training iterations of the model are conducted using an adaptive input sampling strategy. In a particular iteration, index values for a set of training observations are selected based on a set of sampling weights, parameters of the model are updated based on results using training observations identified by the index values, and sampling weights are modified. A result obtained from a trained version of the machine learning model is provided.

20 Claims, 8 Drawing Sheets

(56) References Cited

OTHER PUBLICATIONS

David A. McAllester, "PAC-Bayesian Model Averaging", In Computational Learning Theory, 1999, pp. 1-20.
Deanna Needell, et al., "Stochastic Gradient Descent, Weighted Sampling, and the Randomized Kaczmarz algorithm", In Neural Information Processing Systems, 2014, pp. 1-9.
Daniel Vainsencher, et al., "Local Smoothness in Variance Reduced Optimization", In Neural Information Processing Systems, 2015, pp. 1-9.
Ilja Kuzborskij, et al., "Data-Dependent Stability of Stochastic Gradient Descent", arXiv:1703.01678v3 [cs.LG], May 26, 2017, pp. 1-23.
John Duchi, et al., "Adaptive Subgradient Methods for Online Learning and Stochastic Optimization", Journal of Machine Learning Research 12, 2011, pp. 2121-2159.
Tom Zahavy, et al., "Ensemble Robustness and Generalization of Stochastic Deep Learning Algorithms" arXiv:1602.02389v4 [cs.LG], Nov. 5, 2017, pp. 1-16.
John Langford, et al., "PAC-Bayes & Margins", In Neural Information Processing Systems, 2002, pp. 1-8.
Junhong Lin, et al., "Generalization Properties and Implicit Regularization for Multiple Passes SGM", Proceedings of the 33rd International Conference on Machine Learning, 2016, pp. 1-9.
Junhong Lin, et al., "Optimal Learning for Multi-pass Stochastic Gradient Methods", 30th Conference of Neural Information Processing Systems (NIPS 2016), pp. 1-9.
Luc Begin, et al., "PAC-Bayesian Bounds based on the Renyi Divergence", Proceedings of the 19th International Conference on Artificial Intelligence and Statistics (AISTATS), 2016, pp. 435-444.
Leon Bottou, et al., "The Tradeoffs of Large Scale Learning", In Neural Information Processing Systems, 2008, pp. 1-8.
Lorenzo Rosasco, et al., "Learning with Incremental Iterative Regularization", In Neural Information Processing Systems, 2015, pp. 1-9.
Michael Collins, et al., "Exponentiated Gradient Algorithms for Conditional Random Fields and Max-Margin Markov Networks", Journal of Machine Learning Research 9, 2008, pp. 1775-1822.
Moritz Hardt, et al., "Train faster, generalize better: Stability of stochastic gradient descent", arXiv:1509.01240v2 [cs.LG], Feb. 9, 2016, pp. 1-32.
Matthias Seeger, "PAC-Bayesian Generalisation Error Bounds for Gaussian Process Classification", Journal of Machine Learning Research 3, 2002, pp. 233-269.
AWS, "Amazon Machine Learning Developer Guide Version Latest", Copyright 2017 Amazon Web Services, pp. 1-146.
Olivier Bousquet, et al., "Stability and Generalization", Journal of Machine Learning Research 2, 2002, pp. 499-526.
Olivier Catoni, "Pac-Bayesian Supervised Classification: The Thermodynamics of Statistical Learning", arXiv:0712.0248v1 [stat.ML], Dec. 3, 2007, pp. 1-175.
Pascal Germain, et al., "PAC-Bayesian Learning of Linear Classifiers", Proceedings of the 26th International Conference of Machine Learning, 2009, pp. 1-8.
Peilin Zhao, et al., "Stochastic Optimization with Importance Sampling for Regularized Loss Minimization", Proceedings of the 32nd International Conference on Machine Learning, 2015, pp. 1-9.
Shai Shalev-Shwartz, et al, "Learnability, Stability and Uniform Convergence", Journal of Machine Learning Research 11, 2010, pp. 2635-2670.
Shai Shalev-Shwartz, et al., "Minimizing the Maximal Loss: How and Why", Proceedings of the 33rd International Conference on Machine Learning, 2016, pp. 1-13.
Shai Shalev-Shwartz, "SelfieBoost: A Bossting Algorithm for Deep Learning", arXiv:1411.3436v2 [stat.ML], Apr. 8, 2017, pp. 1-15.
Wassily Hoeffding, "Probability Inequalities for Sums of Bounded Random Variables", Journal of the American Statistical Association, vol. 58, Issue 301, Mar. 1963, pp. 13-30.
Yoshua Bengio, et al., "Curriculum Learning", Proceedings of the 26th International Conference on Machine Learning, 2009, pp. 1-9.
Yoav Freund, et al., "A decision-theoretic generalization of on-line learning and an application to boosting", Journal of Computer and System Sciences, Dec. 19, 1997, pp. 1-35.
Yu-Xiang Wang, et al., "Learning with Differential Privacy: Stability, Learnability and the Sufficiency and Necessity of ERM Principle", Journal Of Machine Learning Research 17, 2016, pp. 1-40.
Zeyuan Allen-Zhu, et al., "Even Faster Accelerated Coordinate Descent Using Non-Uniform Sampling", Proceedings of the 33rd International Conference on Machine Learning, 2016, pp. 1-10.

\* cited by examiner

US 11,200,511 B1

ADAPTIVE SAMPLING OF TRAINING DATA FOR MACHINE LEARNING MODELS BASED ON PAC-BAYES ANALYSIS OF RISK BOUNDS

BACKGROUND

In recent years, as the costs of collecting and storing data has decreased, machine learning algorithms that analyze collected data sets for various types of predictions are being increasingly employed to increase the effectiveness of various services and applications. For example, large amounts of data with respect to user interactions with network-accessible applications (such as e-retail applications) may be collected, using logs generated at the applications, and used to enhance usability or customize user experiences with the applications. Similarly, data collected from numerous sensors may be analyzed to improve the functionality of various devices and algorithms, including algorithms for enhancing security, predicting failures, and so on.

In many common machine learning methodologies, a set of input observations is used to train a model, and the trained model is then used to generate predictions. In one broad class of algorithms called supervised learning algorithms, each of the input observations used for training includes values for some set of attributes and a label, and the model in effect "learns" how to predict labels for previously-unseen unlabeled input from the attribute values seen in the training-stage input observations. For example, in a medical application, an individual patient's medical data record, comprising entries collected from various instruments, medical scanning/imaging devices and the like may be labeled to indicate whether the patient suffers from a particular illness or not. Large numbers of such labeled records may then be used as a training data set for a machine learning model, with the objective of subsequently using the trained model to predict the probability that a given patient (whose medical record was not part of the training data set and is thus unlabeled) suffers from the same illness.

In iterative training algorithms for machine learning models, the accuracy of the model predictions is gradually increased by adjusting model parameters based on the prediction error encountered when the current set of model parameters is used to generate predictions for some set of training observations. Randomized iterative learning algorithms (such as various versions of gradient descent algorithms), in which the set of observations used for a given iteration is typically sampled at random from the training data set, have been used for a wide variety of applications. Given the large sizes (e.g., tens of millions of observations) of training data sets used for some applications, however, and the potential of skewed distributions of values of important attributes in the training data, choosing training observations completely at random may not necessarily lead to the most efficient use of training resources. However, when considering changes to traditional random sampling approaches, the risks associated with poor generalizability may also have to be taken into account.

Figure 1:
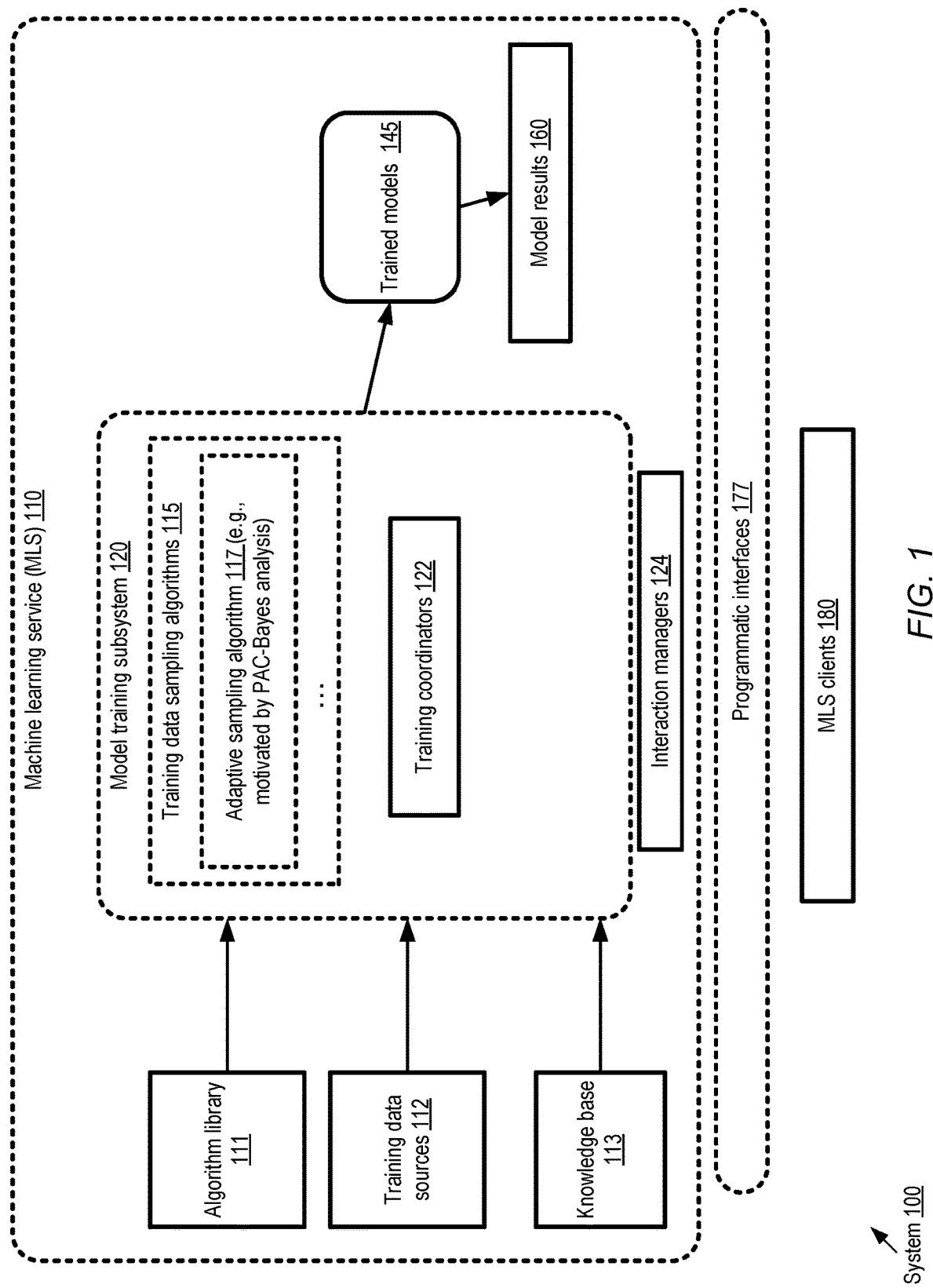
FIG. 1 illustrates an example system environment in which adaptive sampling of training data for machine learning models may be employed, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for adaptive sampling of training data for machine learning models are described. In addition, a summary of some aspects of the PAC-Bayesian analysis which motivates the adaptive sampling algorithm is provided. According to some embodiments, resources of a network-accessible machine learning service (MLS) may be used to train machine learning models for various applications, and then to execute the trained versions of the models. In one embodiment, an indication of a training data set to be used for a machine learning model may be obtained at the service—for example, a storage location or a universal resource locator (URL) from which various observation records of the training data can be read may be obtained. The learning algorithm of the machine learning model (such as stochastic gradient descent or a variant thereof) may meet one or more stability criteria associated with determining risk bounds using a methodology called PAC-Bayesian analysis; additional details regarding various definitions of stability and risk bound calculations are provided below.

In at least some embodiments, a determination may be made as to whether adaptive sampling is to be used for training iterations of the model, e.g., based on a quick analysis of the extent to which attribute values within the training data set appear to be skewed, based on the size of the training data set, and so on. If a decision to use adaptive sampling is made, training iterations which use dynamically modified sampling weights associated with respective training examples may be performed. Respective index values may be assigned to the training examples in some embodiments and used to refer to the examples—e.g., integer values from 1 to N may be assigned to a training data set with N examples. A tree data structure which may be utilized in some embodiments to store sampling weights and efficiently identify index values based on the weights is discussed below in further detail. In various embodiments, in a given training iteration, one or more index values may be selected based on a current set of sampling weights associated with the corresponding examples. The number of index values selected may depend on the size of the batch of examples to be used for the iteration, which may represent one of the hyperparameters of the training process. The observation examples corresponding to the selected index values may be provided as inputs to the current version of the model. The results obtained from the current version may then be used to update the model parameters. In various embodiments, one or more of the sampling weights associated with the training examples may be modified in a given training iteration, e.g., based at least in part on a utility function (which may be related to the objective or loss function of the learning algorithm), an amplitude parameter, and a decay parameter. As a result of the update to the sampling weight(s), the probability of using a given training example may change from one iteration to another in various embodiments, with the more useful or difficult training observations eventually being assigned higher weights. After the training phase of the model concludes (e.g., based on a desired level of convergence with respect to the model's loss function, and/or based on the exhaustion of resources or time available for the training), the model may be used to generate results for data records which were not part of the training data set, and the results may be used in an application-dependent manner. A number of different types of utility functions may be used to update the sampling weights in various embodiments. In one embodiment, the utility function may be based at least in part on the training iteration count, values of the current set of parameters of the model being trained, and/or based on the observation records associated with the selected index values. In some embodiments, the 0-1 loss function or an L1 loss may be used as the utility function.

A wide variety of models may use randomized learning algorithms for which training data can be sampled using an adaptive approach, including for example convolutional and other neural network models. In at least some embodiments, a machine learning service at which adaptive sampling techniques are used for training observations may implement one or more programmatic interfaces, such as a web-based console, a set of application programming interfaces (APIs), command-line tools, graphical user interfaces and the like. The programmatic interfaces may be used by clients of the machine learning service to submit requests, including model training requests, and receive corresponding responses from the service. In at least some embodiments, a model training request received from a client may trigger the adaptive sampling based training of a model. In one embodiment, a preference or request for adaptive sampling may be included in a training request submitted by a client. In one embodiment, statistics pertaining to the adaptive sampling methodology, such as the current sampling weights assigned at various stages of training, may be provided to clients via programmatic interfaces, e.g., in response to queries from experimenters trying out different training techniques. In at least some embodiments, clients may provide preferences regarding various hyperparameters to the machine learning service—e.g., experienced data scientists may provide recommendations regarding the utility function to be used for updating the sampling weights, the amplitude parameter and/or the decay parameter. In some embodiments, the machine learning service may comprise a knowledge base in which records of experiences with various hyperparameter settings used in previous model training exercises may be stored, and the contents of such a knowledge base may be used to select the hyperparameters for some model training phases.

The "PAC" portion of the name "PAC-Bayes" stands for "probably approximately correct", while the "Bayes" part is of course related to the well-known Bayes theorem and related analytic techniques. In various embodiments, using an analysis methodology which combines the PAC-Bayes approach with algorithmic stability considerations, risk bounds may be identified for randomized learning algorithms. Such an analysis may motivate the kinds of adaptive sampling techniques discussed at a high level above and described in more detail below. A summary of the methodology is provided below, together with pseudo-code of the adaptive sampling algorithm.

Analysis Framework and Theorems

In a PAC-Bayes approach, a prior distribution $\mathbb{P}$ is fixed on the hypothesis space, $\mathcal{H}$; then, given a sample of training data, $S \sim \mathbb{D}^n$, we learn a posterior distribution, $\mathbb{Q}$, also on $\mathcal{H}$. In an extension used for randomized learning algorithms, $\mathbb{P}$ and $\mathbb{Q}$ may instead be defined on the hyperparameter space $\Theta$. Moreover, while some PAC-Bayes analyses are concerned with $\mathbb{E}_{h \sim \mathbb{Q}}[L(h,z)]$, (where L is a loss function and z represents labeled training examples), the expected loss over draws of hyperparameters, $\mathbb{E}_{h \sim \mathbb{Q}}[L(A(S, \theta), z)]$ (where A is a randomized learning algorithm, S is a dataset of labeled examples, and $\theta \in \Theta$) may be studied using the analysis approach discussed below. The term "draw", as used in this discussion of PAC-Bayesian analysis, is synonymous with the term "sample". The goal will be to upper-bound the generalization error of the posterior, $G(S, \mathbb{Q})$, which thereby upper-bounds the risk, $R(S, \mathbb{Q})$, by a function of the empirical risk, $\hat{R}(S, \mathbb{Q})$.

The bounds obtained are polynomial in $\delta^{-1}$ for a free parameter $\delta \in (0, 1)$, and hold with probability at least $1-\delta$ over draws of a finite training dataset. This stands in contrast to some other approaches that may provide bounds for generalization in expectation; i.e., upper bounds on $\mathbb{E}_{S \sim D^n}[G(S, \mathbb{P})]$. While expectation bounds are useful for gaining insight into generalization behavior, high-probability bounds are sometimes preferred. Note that it is always possible to convert a high-probability bound into an expectation bound.

Another useful property of PAC-Bayes bounds is that they hold (with high probability) for all posteriors simultaneously, including those that explicitly depend on the training data. In various embodiments, it may be helpful to sample the input data being used for a random learning algorithm such as stochastic gradient descent according to a data-dependent distribution. Suppose that in one example scenario in which SGD is being used for a classifier, most training examples are "easy" to classify (e.g., far from the decision boundary), but some are "difficult" (e.g., near the decision boundary, or noisy). If we sample points uniformly at random, we might encounter mostly easy examples, which could slow progress on difficult examples. If we instead focus training on the difficult set, we might converge more quickly to an optimal hypothesis. Since our PAC-Bayes bounds hold for all hyperparameter posteriors, we can characterize the generalization error of algorithms that optimize the posterior using the training data. Of course, there may be a penalty for overfitting the posterior to the data, captured in our bounds by the posterior's divergence from the prior.

A brief introduction to stability criteria associated with randomized learning algorithms is provided below, followed by a discussion of a number of different PAC-Bayesian theorems which have been proved for randomized learning algorithms with respective characteristics regarding stability. These theorems provide the motivation for the adaptive sampling algorithm (Algorithm 1) whose pseudo-code is presented after the theorems.

Informally, stability measures the change in loss when the inputs to a learning algorithm are perturbed; a learning algorithm is stable if the loss changes proportionally to the perturbations. In other words, a learning algorithm should not be overly sensitive to any single input. As discussed below, the inputs to a learning algorithm may comprise several different elements, including the training data set as well as hyperparameter values. Stability is crucial for generalization—the extent to which a learning algorithm makes accurate predictions on unlabeled observations that were not used for training. In this section, several notions of stability tailored for randomized learning algorithms are discussed. The term $D_H$ is used to denote the Hamming distance in the discussion of stability. The term "data stability" may be used in various embodiments to refer to stability of the algorithm with respect to perturbations of the training data, while the term "Hyperparameter Stability" may be used to refer to algorithm stability with respect to hyperparameter perturbations.

Definition 1 (Uniform Stability): A randomized learning algorithm, $\mathcal{A}$, is $\beta_Z$-uniformly stable with respect to a loss function, $L$, and a distribution, $\mathbb{P}$ on $\Theta$, if:

$$\sup_{S,S' \in \mathcal{Z}^n : D_n(S,S')=1} \sup_{z \in \mathcal{Z}} \mathbb{E}_{\theta \sim \mathbb{P}}[|L(\mathcal{A},(S,\theta),z) - L(\mathcal{A}(S',\theta),z)|] \leq \beta_Z.$$

Definition 2 (Pointwise Hypothesis Stability): For a given dataset, $S$, let $S^{i,z}$ denote the result of replacing the $i^{th}$ example with example $z$. A randomized learning algorithm, $\mathcal{A}$, is $\beta$-hypothesis stable with respect to a loss function, $L$, and a distribution, $\mathbb{P}$ on $\Theta$, if:

$$\sup_{i \in \{1,\ldots,n\}} \mathbb{E}_{S \sim \mathbb{D}^n} \mathbb{E}_{z \sim \mathbb{D}} \mathbb{E}_{\theta \sim \mathbb{P}}[|L(\mathcal{A}(S,\theta),z_i) - L(\mathcal{A}(S^{i,z},\theta),z_i)|] \leq \beta_Z.$$

Uniform stability measures the maximum change in loss due to replacing any single training example, whereas pointwise hypothesis stability measures the expected change in loss on a random training example when that example is removed from the training data. It is easy to see that uniform stability implies pointwise hypothesis stability, but not vice versa. Thus, while uniform stability enables sharper risk bounds, pointwise hypothesis stability supports a wider range of learning algorithms.

In addition to data stability, we might also require stability with respect to changes in the hyperparameters. From this point forward, we will assume that the hyperparameter space, $\Theta$, decomposes into the product of $T$ subspaces, $\Pi_{t=1,T}\Theta_t$. For example, $\Theta$ could be the set all sequences of example indices, $\{1, \ldots, n\}^T$ used to sample a training data set of size n in an implementation of SGD (stochastic gradient descent).

Definition 3 (Hyperparameter Stability): A randomized learning algorithm, $\mathcal{A}$, is $\beta_\Theta$-uniformly stable with respect to a loss function, $L$ if:

$$\sup_{S \in \mathcal{Z}^n, \theta' \in \Theta : D_n(\theta,\theta')=1} \sup_{z \in \mathcal{Z}} \sup[|L(A(S,\theta),z) - L(A(S,\theta'),z)|] \leq \beta_\Theta.$$

If an algorithm $\mathcal{A}$ is both $\beta_Z$-uniformly and $\beta_\Theta$-uniformly stable, $\mathcal{A}$ may be described as being ($\beta_Z$, $\beta_\Theta$)-uniformly stable in various embodiments. With respect to SGD algorithms with uniform sampling and decaying step sizes, the following proposition for uniform stability with respect to both data and hyperparameters may be proved:

SGD stability proposition: Assume that the loss function, $L$, is $\lambda$-Lipschitz, and that the SGD objective function, $F$, is $\gamma$-strongly convex, $\lambda$-Lipschitz and $\sigma$-smooth. Suppose SGD with uniform sampling is run for $T$ iterations with step sizes $\eta_t \triangleq (\gamma t + \sigma)^{-1}$. Then, SGD is ($\beta_Z$, $\beta_\Theta$)-uniformly stable with $\beta_Z <= 2\lambda^2/\gamma n$ and $\beta_\Theta <= 2\lambda^2/\gamma T$.

It is noted that analogous propositions for weaker forms of stability than uniform stability may also be proved, making bounds of the kind discussed here applicable to a wider range of algorithms.

Using the above definitions of stability properties of learning algorithms, the following PAC-Bayesian theorems may be introduced.

Theorem 1: Suppose $\mathcal{A}$ is a $\beta_Z$-pointwise hypothesis stable learning algorithm with respect to an M-bounded loss function, $L$, and a fixed product measure, $\mathbb{P}$ on $\Theta$. Then, for any $n \geq 1$ and $\delta \in (0, 1)$, with probability at least $1-\delta$ over draws of a dataset, $S \sim \mathbb{D}^n$, every posterior, $\mathbb{Q}$ on $\Theta$, satisfies the following equation ET1:

$$R(S, \mathbb{Q}) - \hat{R}(S, \mathbb{Q}) \leq \sqrt{(\chi^2(\mathbb{Q}\|\mathbb{P}) + 1)\left(\frac{2M^2 + 12Mn\beta_Z}{\delta n}\right)},$$

where the $\chi^2$ divergence from $\mathbb{P}$ to $\mathbb{Q}$ is:

$$\chi^2(\mathbb{Q}\|\mathbb{P}) \triangleq \mathbb{E}_{\theta \sim \mathbb{P}}\left[\left(\frac{\mathbb{Q}(\theta)}{\mathbb{P}(\theta)}\right)^2 - 1\right]$$

Theorem 2: Suppose $\mathcal{A}$ is a ($\beta_Z$, $\beta_\Theta$)-uniformly stable learning algorithm with respect to an M-bounded loss function, $L$, and a fixed product measure, $\mathbb{P}$ on $\Theta$. Then, for any $n \geq 1$, $T \geq 1$ and $\delta \in (0, 1)$, with probability at least $1-\delta$ over draws of a dataset, $S \sim \mathbb{D}^n$, every posterior, $\mathbb{Q}$ on $\Theta$, satisfies the following equation ET2:

$$R(S,\mathbb{Q}) - \hat{R}(S,\mathbb{Q}) \le \beta_Z + \sqrt{2\left(D_{KL}(\mathbb{Q}\|\mathbb{P}) + \ln\frac{2}{\delta}\right)\left(\frac{(M+2n\beta_Z)^2}{n} + 4T\beta_\Theta^2\right)},$$

where the KL (Kullback-Leibler) divergence from $\mathbb{P}$ to $\mathbb{Q}$ is:

$$D_{KL}(\mathbb{Q}\|\mathbb{P}) \triangleq \mathbb{E}_{\theta \sim \mathbb{Q}}\left[\ln\left(\frac{\mathbb{Q}(\theta)}{\mathbb{P}(\theta)}\right)\right]$$

Since Theorems 1 and 2 hold simultaneously for all hyperparameter posteriors, they provide generalization guarantees for SGD with any sampling distribution. Note that the stability requirements only need to be satisfied by the fixed prior, such as a uniform distribution. It can be demonstrated that this simple prior can have $(O(n^{-1}), O(T^{-1}))$-uniform stability under certain conditions. Importantly, Theorem 1 does not require hyperparameter stability, and is therefore of interest for non-convex losses, since it is not known whether uniform hyperparameter stability can be satisfied with a non-convex loss function.

Equation ET2 holds with high probability over draws of a dataset, but the risk is in expectation over draws of hyperparameters. To obtain a bound that holds with high probability over draws of both data and hyperparameters, we may consider posteriors that are product measures.

Theorem 3: Suppose $\mathcal{A}$ is a $(\beta_Z, \beta_\Theta)$-uniformly stable learning algorithm with respect to an M-bounded loss function, L, and a fixed product measure, $\mathbb{P}$ on $\Theta$. Then, for any $n \ge 1$, and $\delta \in (0,1)$, with probability at least 1-$\delta$ over draws of both a dataset, $S \sim \mathbb{D}^n$, and hyperparameters, $\theta \sim \mathbb{Q}$, from any posterior product measure, $\mathbb{Q}$, on $\Theta$, the following equation ET3 holds:

$$R(S,\theta) - \hat{R}(S,\theta) \le$$
$$\beta_Z + \beta_\Theta\sqrt{2T\ln\frac{2}{\delta}} + \sqrt{2\left(D_{KL}(\mathbb{Q}\|\mathbb{P}) + \ln\frac{4}{\delta}\right)\left(\frac{(M+2n\beta_Z)^2}{n} + 4T\beta_\Theta^2\right)}.$$

In the summation on the right side of the inequality of equation ET3, if $\beta_\Theta = O(T^{-1})$, the term $$B_\Theta\sqrt{2T\ln\frac{2}{\delta}}.$$

vanishes at a rate of $O(T^{-1})$, or $(O(n^{-1/2})$ if $T>=n$.

The PAC-Bayesian theorems 1, 2 and 3 provided above motivate data-dependent posterior distributions on the hyperparameter space. Intuitively, certain posteriors may improve, or speed up, learning from a given dataset. For instance, suppose certain training examples are considered valuable for reducing empirical risk; then, a sampling posterior for SGD should weight those examples more heavily than others, so that the learning algorithm can, probabilistically, focus its attention on the valuable examples. However, a posterior should also try to stay close to the prior, to control the divergence penalty in the generalization bounds. Based on this approach, Algorithm 1 (for which pseudo-code is provided below) which automatically generates a posterior based on the training data, may be employed in various embodiments. Algorithm 1 may operate alongside the learning algorithm (which may, for example, comprise any variant of stochastic gradient descent or other algorithms which meet the criteria outlined in the theorems), iteratively generating the posterior as a sequence of conditional distributions on the training dataset. Each round of training may generate a new distribution, given the previous rounds. Thus, the posterior may dynamically adapt to training.

Pseudo-Code for Algorithm 1:
Require: Examples $(z_1, \ldots, z_n)$; initial model $h_0 \in \mathcal{H}$; update rule $U: \{1, \ldots, T\} \times \mathcal{H} \times Z \to \mathcal{H}$; utility function $f: Z \times \mathcal{A} \times \mathcal{H} \to \mathbb{R}$; amplitude $\alpha \in (0, \infty)$; decay $\tau \in (0, 1)$.
1. $\forall i, q_i \leftarrow 1$ // initialize sampling weights $q_i$ for all examples to 1
2. for $t=1, \ldots, T$ do
3. $i_t \sim \mathbb{Q}_t \propto \{q_i\}$ // draw index $i_t$ proportional to $\{q_i\}$
4. $h_t \leftarrow U_t(h_{t-1}, z_{i_t})$ // update model
5. $q_{i_t} \leftarrow q_{i_t}^\tau \exp(\alpha f(z_{i_t}, h_t))$ // update sampling weight for $i_t$
6. endfor
7. return h Algorithm 1 maintains a set of nonnegative sampling weights, $\{q_i\}$ for i from 1 to n, to 1 (line 1), which define a distribution on the training data set. The posterior probability of the $i^{th}$ example in the $t^{th}$ iteration, given the previous iterations, is proportional to the $i^{th}$ weight: $\mathbb{Q}_t(i) = \mathbb{Q}(i_t | i_1, \ldots, i_{t-1}) \propto q_i$. At each iteration t of training, we draw an index, $i_t \sim \mathbb{Q}_t(i)$ in line 3, then use example $z_{i_t}$ to update the model (line 4). We then update the weight for $i_t$ multiplicatively as $q_{i_t} \leftarrow q_{i_t}^\tau \exp(\alpha f(z_{i_t}, h_t))$, where: $f(z_{i_t}, h_t)$ is a predefined utility function of the chosen example and current model; $\alpha$ is an amplitude parameter, which controls the aggressiveness of the update; and $\tau$ is a decay parameter, which lets the weight gradually forget past updates.

It is important to note that in the approach outlined above, we do not actually need to compute the example distribution—which would take O(n) time per iteration—in order to sample from it. Indeed, using the algorithm and a tree data structure described in further detail below, we can sample from and update the distribution in O(log n) time, using O(n) space in at least some implementations. Thus, in various embodiments, the additional iteration complexity of running Algorithm 1 is logarithmic in the size of the dataset, which may be important when learning from large datasets.

In various embodiments, stochastic gradient descent may be applied with mini-batching. When mini-batching is used, multiple examples may be drawn at each round, instead of just one. Given the massive parallelism of today's computing hardware, mini-batching may represent a more efficient way to process a dataset, and can result in more accurate gradient estimates than single-sample updates. It is noted that although Algorithm 1 is stated for single-sample updates in the formulation shown above, it may be modified in a straightforward manner to support mini-batching in various embodiments by replacing line 3 with multiple independent and identically distributed draws from $\mathbb{Q}_t$, and line 5 with sampling weight updates for each unique example in the mini-batch. (It an example is drawn multiple times in a mini-batch, its sampling weight is only updated once.)

To obtain an upper bound on the KL divergence resulting from Algorithm 1 in terms of interpretable, data-dependent quantities, Theorem 4 shown below may be proved. The new notation used in Theorem 4 may be defined as follows: Given a draw of indices $i_1, \ldots, i_t$, let $N_{i,t} \triangleq |\{t':t' \in \{1, \ldots, t\}, i_{t'}=i\}|$ denote the number of times that index i was chosen before iteration t. Let $O_{i,j}$ denote the $j^{th}$ iteration in which i was chosen; e.g., if i was chosen at rounds 13 and 47, then $O_{i,1}=13$ and $O_{i,2}=47$.

Theorem 4: Fix a uniform prior, $\mathbb{P}$. If Algorithm 1 is run for T rounds, then the following equation (ET4) is satisfied:

$$D_{KL}(\mathbb{Q}\|\mathbb{P}) \leq \sum_{t=2}^{T} \mathop{\mathbb{E}}_{(i_1,\ldots,i_t)\sim\mathbb{Q}} \frac{\alpha}{n} \sum_{i=1}^{n} \left[ \sum_{j=1}^{N_{i_t,t}} f(z_{i_t}, h_{O_{i_t,j}})\tau^{N_{i_t,t-j}} - \sum_{k=1}^{N_{i,t}} f(z_i, h_{O_{i,k}})\tau^{N_{i,t-k}} \right].$$

ET4 can be interpreted as measuring, on average, how the cumulative past utilities of each sampled index, it, differ from the cumulative utilities of any other index, i. (When $N_{i,t}=0$, a summation over j=1, ..., $N_{i,t}$ evaluates to 0.) When the posterior becomes too focused on certain examples, this difference is large. The accumulated utilities decay exponentially, with the rate of decay controlled by $\tau$. The amplitude, $\alpha$, scales the entire bound, which means that aggressive posterior updates may adversely affect generalization.

An interesting special case of Theorem 4 is when the utility function is nonnegative, which results in a simpler, more interpretable bound.

Theorem 5: Fix a uniform prior, $\mathbb{P}$ on $\{1, \ldots, n\}^T$. If Algorithm 1 is run for T rounds with a non-negative utility function $f$, then the posterior $\mathbb{Q}$ satisfies the following equation (ET5):

$$D_{KL}(\mathbb{Q}\|\mathbb{P}) \leq \frac{\alpha}{1-\tau} \sum_{t=1}^{T-1} \mathop{\mathbb{E}}_{(i_1,\ldots,i_t)\sim\mathbb{Q}} [f(z_{i_t}, h_t)].$$

Equation ET5 is simply the sum of expected utilities computed over T−1 iterations of training, scaled by $\alpha/(1-\tau)$. The implications for this bound are interesting when the utility function is defined as the loss, $f(z,h) \triangleq L(h,z)$; then, if SGD quickly converges to a model with low maximal loss on the training data, it can reduce the generalization error. (This interpretation concurs with ideas in the literature.) The caveat is that tuning the amplitude or decay to speed up convergence may actually counteract this effect. It is noted that similar claims hold for a mini-batch variant of Algorithm 1—the bounds are essentially unchanged, modulo notational intricacies.

Example System Environment

FIG. 1 illustrates an example system environment in which adaptive sampling of training data for machine learning models may be employed, according to at least some embodiments. As shown, system 100 may comprise various resources and artifacts of a machine learning service (MLS) 110, including a model training subsystem 120. Clients 180 of the MLS may submit various types of requests to the MLS via a set of programmatic interfaces 177, including for example requests to train and/or execute machine learning models. Interaction managers 124 of the MLS 110, comprising one or more computing devices, may act as intermediaries between the clients and the service in the depicted embodiment. As such, the interaction managers 124 may receive the programmatic requests submitted by the clients, parse the requests, distribute the work operations indicated in the programmatic requests to other components of the MLS, collect responses generated by the internal components, and provide the responses to the clients in the appropriate formats.

For at least some classes of algorithms of library 111 which are trained iteratively, such as various variants of stochastic gradient descent (SGD) algorithms which meet the stability conditions indicated in the theorems discussed above, respective groups of one or more training examples may have to be selected from the training data set. An adaptive sampling algorithm similar to Algorithm 1 presented above may be employed in various embodiments to select the examples. In the depicted embodiment, an indication of a training data set to be used for the model may be provided by a client—e.g., the addresses or locations at which files containing training examples are stored within one or more training data sources 112 may be indicated as a parameter in a model training request. Training coordinators 122, which may be implemented using one or more computing devices, may be responsible for determining whether adaptive sampling is to be used for the training of a given model in some embodiments. Such decisions may be made, for example, based on a preliminary analysis of the training data, which may for example indicate whether the distributions of various attributes appear to be skewed (in which case adaptive sampling may be preferred). The total size of the training data may also play a role in the decision as to whether to use adaptive sampling in some embodiments: for example, if the training data set is smaller than some pre-determined threshold, the benefits expected from adaptive sampling may be insufficient to justify the additional work involved. In some embodiments, adaptive sampling may be used for training data based simply of the learning algorithm being used, without taking characteristics (such as skew or size) of the training data set into account. In various embodiments, training data sampling algorithms 115 that may be used at the MLS may include other algorithms than the adaptive sampling algorithm 117 motivated by the PAC-Bayes analysis discussed above; for some models, random sampling or other sampling techniques may be used instead of the adaptive sampling technique.

If a decision to use an adaptive sampling algorithm similar to Algorithm 1 is made for a particular model's training phase, a set of hyperparameters of the algorithm (e.g., the utility function, the amplitude parameter, the decay parameter and so on) may be selected, and a data structure to be used to store sampling weights may be initialized and populated with some initial set of weight values. In at least some embodiments, a knowledge base 113 of the MLS 110 may be consulted to obtain guidance regarding the selection of appropriate hyperparameters.

Training iterations corresponding to the for loop in the pseudo-code for Algorithm 1 may be initiated. In a given iteration, one or more index values may be selected based on the current set of sampling weights assigned to the training examples, and the corresponding example observations may be used to obtain results from the current version of the model. The loss associated with the results may then be used to adjust the parameters of the model in various embodiments. The sampling weight(s) may also be adjusted, e.g., based on the selected utility function, the amplitude and decay parameters. When the model training phase is terminated, the trained models may be used to generate model results 160 for previously unseen data (e.g., new records submitted by clients 180 via programmatic interfaces 177) in the depicted embodiment.

Training Data Sampling Techniques

Figure 2:
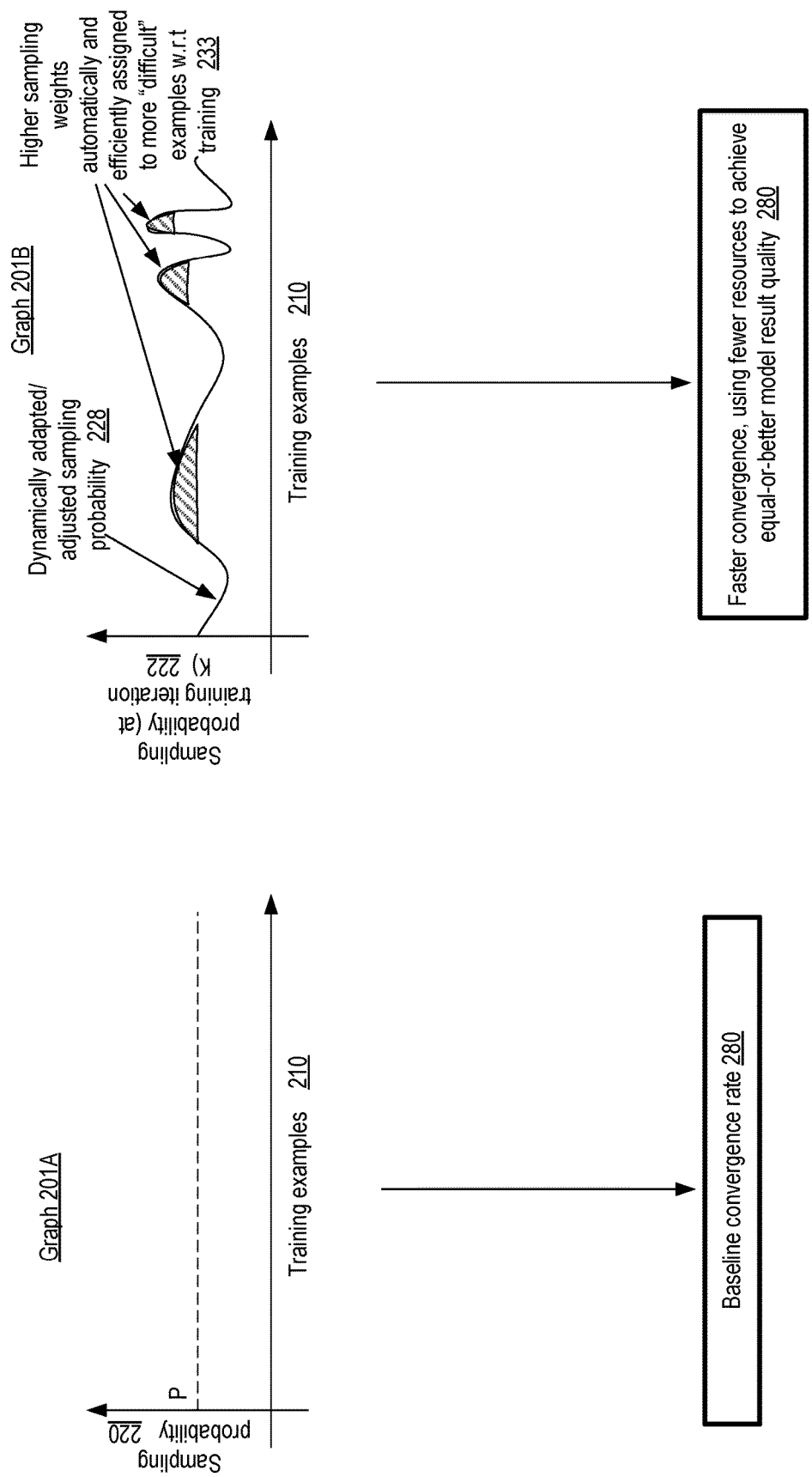
FIG. 2 illustrates example alternative approaches towards sampling training data, according to at least some embodiments.

FIG. 2 illustrates example alternative approaches towards sampling training data, according to at least some embodiments. For many types of randomized learning algorithms including traditional versions of stochastic gradient descent, a fixed or unchanging sampling probability distribution with respect to the available training examples 210 may be used, as shown in graph 201A in which sampling probabilities 220 associated with the different training examples (represented as points along the X-axis) are shown along the Y-axis. In this approach, the probability that any given training example is selected for a given training iteration is set to a constant value P (such as 1/N if there are N examples in all), which does not change as the training progresses.

In contrast, graph 201B represents a snapshot (corresponding to some training iteration K, as indicated in the Y-axis label 222) of the dynamically changing probabilities 228 associated with selecting different training examples when adaptive sampling is used. Higher sampling weights 233 may automatically and efficiently be assigned to training examples that are more "difficult" for the model to learn from, and therefore more useful for the model to learn from.

In scenarios in which the fixed sampling weights or probabilities are used, the convergence rate 280 achieved for the model may be termed the baseline or default convergence rate. In contrast, because higher weights are assigned to the more difficult/valuable examples when adaptive sampling is used, a faster convergence rate 280 may be achieved, in effect using fewer resources to achieve equal-or-better model result quality than would have been achieved without adaptive sampling. In at least some embodiments, a machine learning service may measure the benefits of using adaptive sampling, and provide the measurements to clients via programmatic interfaces. For example, a client may be notified regarding the amount of time (or CPU/disk/memory resources) used for achieving a certain level of model prediction quality with and without adaptive sampling. Alternatively, keeping the amount of resources fixed, an indication of the quality of the model predictions achieved with and without adaptive sampling may be provided to a client in one embodiment, e.g., in response to a query. Such data may be helpful evidence for some clients in deciding whether a particular type of model should or should not be trained using adaptive sampling.

Methods for Adaptive Sampling of Training Data

Figure 3:
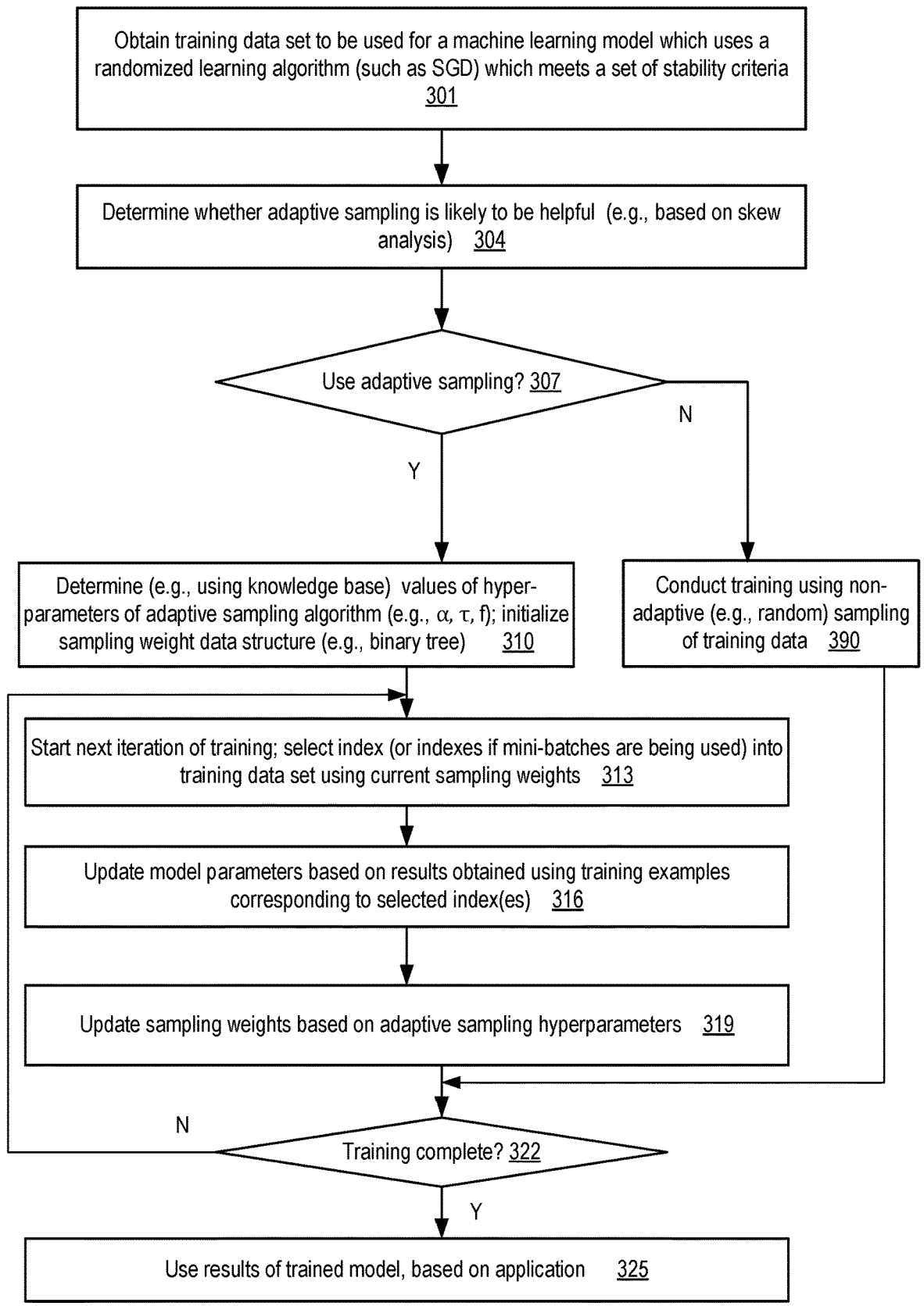
FIG. 3 is a flow diagram illustrating aspects of operations that may be performed to implement adaptive sampling strategies for training data, according to at least some embodiments.

FIG. 3 is a flow diagram illustrating aspects of operations that may be performed to implement adaptive sampling strategies for training data, according to at least some embodiments. As shown in element 301, a training data set comprising various example observations to be used to train a machine learning model which uses a randomized learning algorithm (such as a variant of SGD) may be identified (element 301), e.g., at a machine learning service. The randomized learning algorithm may meet a set of stability criteria similar to those discussed earlier in the context of Theorems 1-4.

A determination may be made as to whether adaptive sampling should be used for the training of the model (element 304). For example, a subset of the training data may be examined to determine whether attribute values are fairly uniformly distributed, or whether the attribute values are skewed; for skewed distributions, the anticipated benefits of adaptive sampling may be higher. In some cases, the decision as to whether to use adaptive sampling or not may be made based on the preferences of the client on whose behalf the model is being trained. If a decision is made that adaptive sampling is not to be used (element 307), the training iterations of the model may be conducted using non-adaptive (e.g., random) sampling (element 390).

If a decision is made to use adaptive sampling (also in operations corresponding to element 307), various hyperparameters of an adaptive sampling algorithm similar to Algorithm 1 whose pseudo-code is provided above may be selected, such as the utility function, the amplitude and the decay parameter (element 310). A data structure to be used to store the sampling weights, such as a binary tree of the kind discussed below, may be initialized in some embodiments. If the example observations are not already labeled or indexed, respective index values such as integers may be assigned to the examples.

Training iterations of the model may then be begun. In a given iteration in the depicted embodiment, the model's parameters may be modified, and the sampling weights assigned to one or more of the training examples may be modified as well. One or more index values corresponding to the training examples may be selected based on the current sampling weights (e.g., in embodiments in which the sampling weights are stored in a tree data structure, using a weight-dependent traversal algorithm described below in further detail) (element 313). In embodiments in which min-batches are used, the number of index values and examples selected may depend on the mini-batch size. The model's parameters may then be modified based on results obtained from the current version of the model using the selected examples as input (element 316). The sampling weights may then be adjusted based on the hyperparameters of the sampling algorithm, such as the utility function, the decay parameter and the amplitude parameter (element 319).

Training iterations may be continued (e.g., by repeating operations corresponding to elements 313, 316 and 319) until training termination criteria are met in various embodiments. Training may be terminated, for example, if the rate of changes to the model parameters falls below a threshold, if a predetermined maximum amount of training resources or time has been consumed, and so on in different embodiments. After the training phase is complete (as determined in element 322), the trained model may be provided with new input (i.e., input which was not part of the training data set) and the results of the model may be used in an application-dependent manner (element 325).

Example Sampling Data Structure

Figure 4:
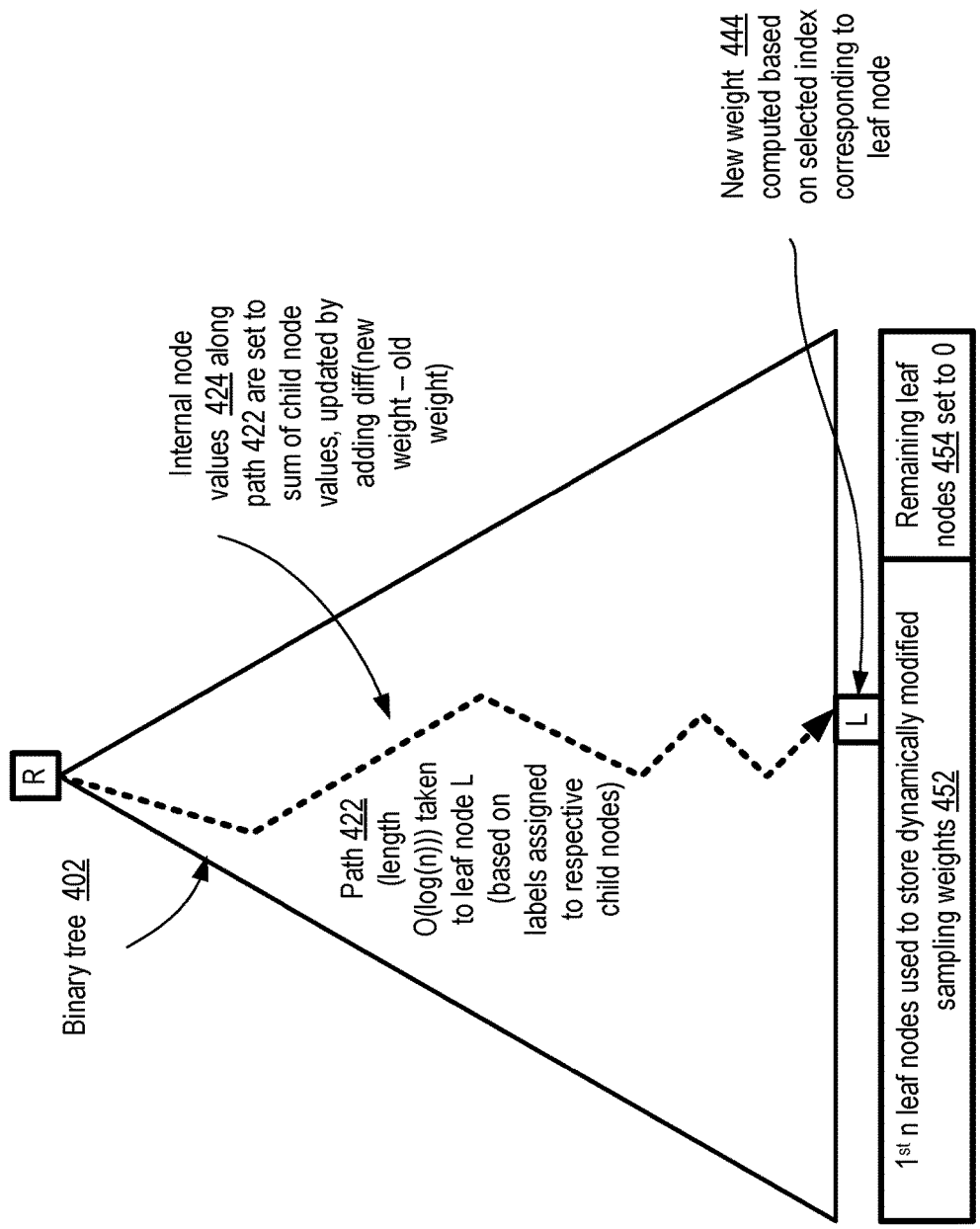
FIG. 4 provides a high-level overview of a tree data structure that may be employed to store sampling weights for large training data sets, according to at least some embodiments.

While sampling training data using uniform weights is trivial, sampling from non-uniform distributions such as those resulting from the weight updates of Algorithm 1 may be somewhat tricky. If the weighted distribution of n examples is static, it may be possible to sample in constant time using a technique called the alias method, using O(n) initialization time and O(n) space. However, in Algorithm 1, the weighted distribution may change in each training iteration, making the alias technique impracticable. Instead, in various embodiments, a binary tree data structure may be used, with the weights being stored at leaf nodes. Pseudo-code for procedures which can be used to initialize, sample, and update the weights using a binary tree is provided below in Algorithm 2. FIG. 4 provides a high-level overview of a tree data structure that may be employed to store sampling weights for large training data sets, according to at least some embodiments.

Pseudo-Code for Algorithm 2 Procedures:
1. procedure INITIALIZE($q_1, \ldots, q_n$)
2. Initialize a full binary tree $\mathcal{T}$ of depth $\lceil \log n \rceil$
3. For i=1, . . . , n label the $i^{th}$ leaf node with $q_i$; label the remaining leaf nodes with 0
4. Label each internal node with the sum of its children's labels.
5. procedure SAMPLE($\mathcal{T}$)
6. v←ROOT($\mathcal{T}$)
7. while v is not a leaf do 8. Flip a biased coin c, with outcome probabilities proportional to the values of v's children
9. if c==HEADS then
10. v←LEFT CHILD
11. else
12. v←RIGHT CHILD
13. endif
14. endwhile
13. return index of leaf node v
14. procedure UPDATE($\mathcal{T}$, i, q)
15. Δ←q-$q_i$
16. for node v on path from root to $i^{th}$ leaf node do
17. add Δ to the value of v
18. endfor In the initialization procedure of Algorithm 2, a full binary tree of depth $\lceil \log n \rceil$ (where n is the total number of training examples) is created. The first n leaf nodes are labeled with the initial sampling weights (e.g., 1/n if uniform initialization is used), and the remaining $2^{\lceil \log n \rceil}$- n nodes are labeled zero. The order of the leaf nodes represents the index values associated with the examples: e.g., leaf node 1 (of then leafs with non-zero labels) represents the first training example, leaf node 2 represents the second training example, and so on. Each internal node is labeled with the sum of its child nodes. During training, as indicated in the sample procedure, a random tree traversal from the root to a leaf node is used for sampling the weighted distribution. For each node encountered on the path to a leaf, a biased coin is flipped. The outcome probabilities of the coin flip are proportional to the values of its child nodes, and the outcome decides whether the left child or the right child is selected for the traversal. The leaf node reached represents the index value of the selected training example. To update the probability or weight associated with a given index, as indicated in the update procedure, the difference of the new weight (computed according to Algorithm 1) and the old weight is added to each of the tree nodes in the path from the root to the selected leaf.

Algorithm 2 requires O(n) initialization time and O(n) space, and the cost of sampling is O(log(n)) (in contrast, in the alias method, the cost of sampling is constant time). However, the tree data structure can be updated in O(log(n)) time. Even for very large n, logarithmic time may be acceptable for iterative sampling and updating, especially as it may take much less time than the amount of time needed to perform a gradient calculation.

FIG. 4 provides a pictorial representation of key aspects of Algorithm 2. In accordance with Algorithm 2, in various embodiments a binary tree 402 may be initialized, with the first n leaf nodes 452 being used to store the sampling weights, and the remaining leaf nodes 454 being set to zero. Internal node labels may be set to the sum of the labels of their respective child nodes. To sample a particular training example, a path 422 may be traversed from the root node R to a leaf node L, with the choices as to whether to take a left child or a right child being based on the labels (probabilities) assigned to the child nodes at each step of the traversal. A new weight 444 for the leaf node L may be computed based on the training example corresponding to that leaf node in various embodiments in accordance with Algorithm 1. To update weights in the tree 402, the difference between the new weight and the old weight is added to the leaf node L and to each internal node 424 traversed along the root-to-leaf path.

Figure 5:
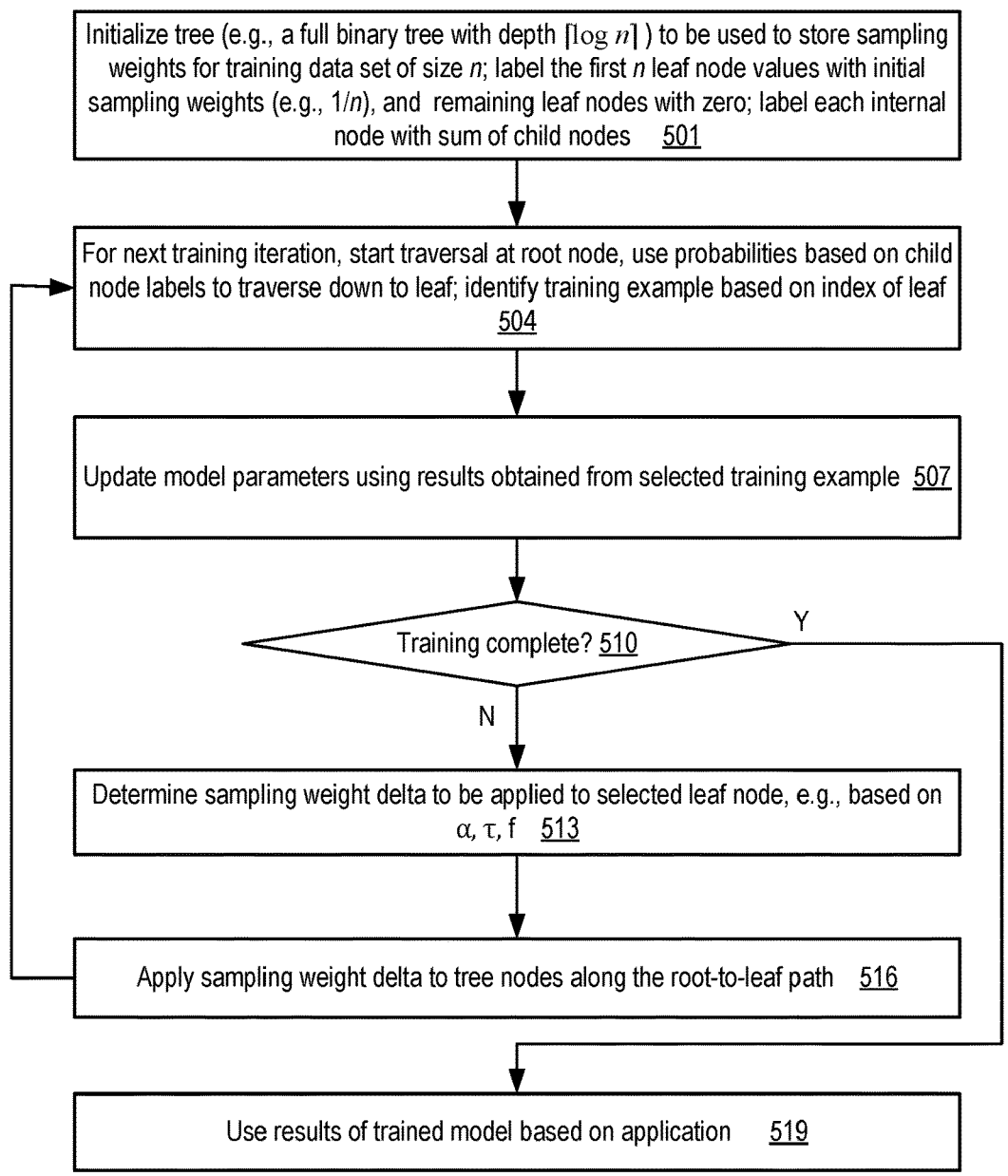
FIG. 5 is a flow diagram illustrating aspects of operations that may be performed to store, access and update sampling weights associated with training examples used for a machine learning model, according to at least some embodiments.

FIG. 5 is a flow diagram illustrating aspects of operations that may be performed to store, access and update sampling weights associated with training examples used for a machine learning model, according to at least some embodiments. As shown in element 501, a tree data structure (e.g., a full binary tree of depth $\lceil \log n \rceil$ may be initialized. The first n leaf nodes may be set to the initial sampling weights selected for the n training examples (e.g., 1/n), and the remaining leaf nodes may be set to zero. To sample a particular training example for a given training iteration a traversal may be started at the root node of the tree, and a path to a leaf node may be determined probabilistically, using the labels assigned to the respective left and right child nodes at each level as an indicator of the probability of choosing that node (element 504). The training example to be used for the training iteration may be selected based on the index of the leaf node reached by the traversal.

The parameters of the model being trained may be adjusted based on the results obtained using the selected training example (element 507). If the training termination criteria are not yet met (element 510), the sampling weight delta to be applied to the selected leaf node may be identified as per Algorithm 1, e.g., based on the utility function f, the amplitude parameter α, and the decay parameter T (element 513), and all the nodes along the root-to-leaf path may be updated by adding the delta (element 516). The random probabilistic traversal may then be performed again for the next training iteration. If mini-batches are used, multiple traversals may be performed during a single training iteration in various embodiments. After the training is complete, results obtained from the trained model may be used in an application-dependent manner (element 519).

It is noted that in various embodiments, some of the operations shown in the flow diagrams of FIG. 3 and/or FIG. 5 may be implemented in a different order than that shown in the figure, or may be performed in parallel rather than sequentially. Additionally, some of the operations shown in FIG. 3 and/or FIG. 5 may not be required in one or more implementations.

Programmatic Interactions

Figure 6:
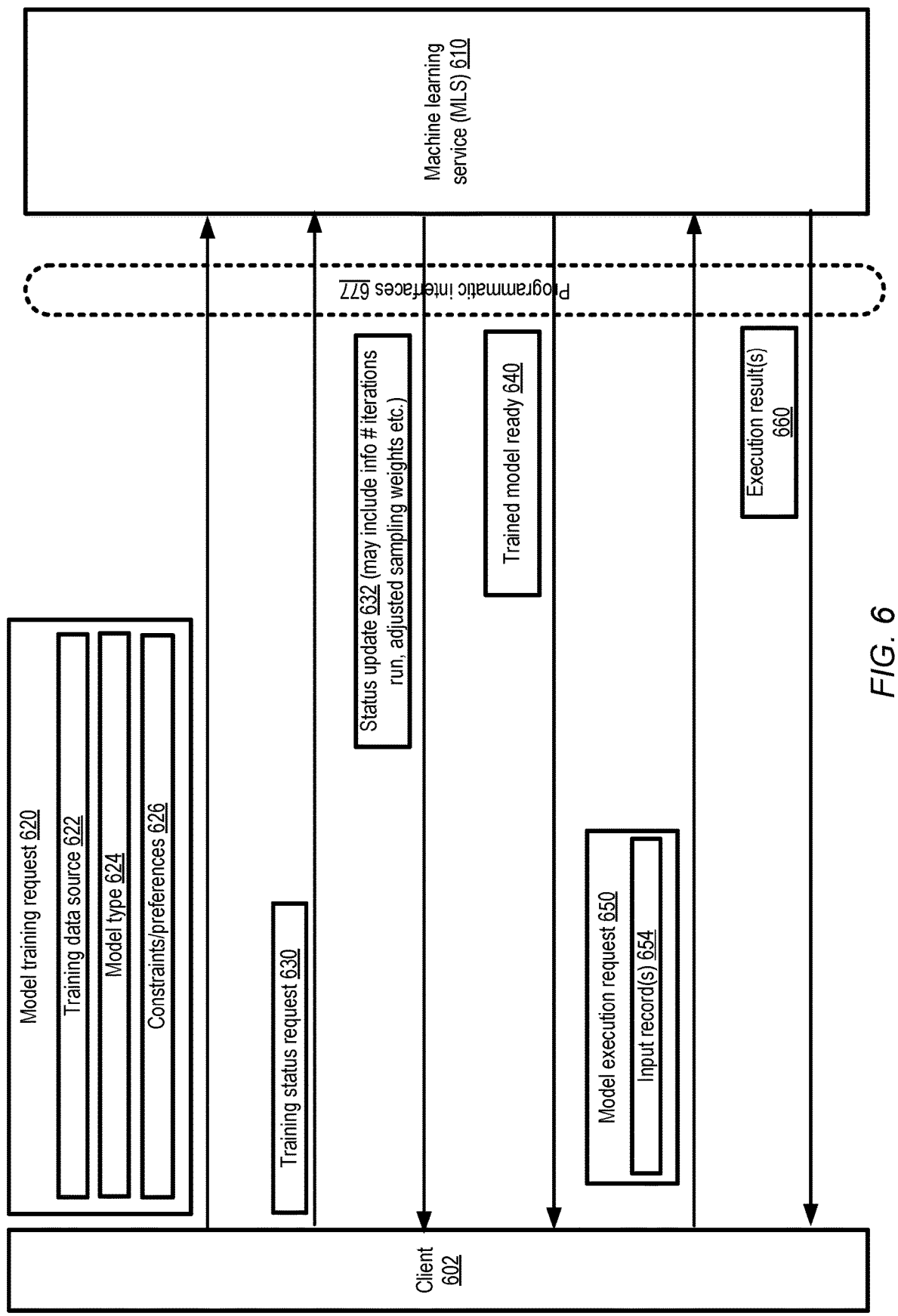
FIG. 6 illustrates example programmatic interactions between clients and a machine learning service at which adaptive sampling of training data may be used, according to at least some embodiments.

FIG. 6 illustrates example programmatic interactions between clients and a machine learning service at which adaptive sampling of training data may be used, according to at least some embodiments. The machine learning service 610 may implement one or more programmatic interfaces 677 in the depicted embodiment, such as a set of APIs, a web-based console, command-line tools, graphical user interfaces, and the like. Using such a programmatic interface, a client 602 may submit a model training request 620 the MLS 610 in the depicted embodiment. The training request may indicate a training data source 622, a model type 624, and/or one or more constraints or preferences 626 pertaining to the training of the model. The model type 624 may, for example, indicate that a neural network model for which SGD is to be used as the learning algorithm is to be trained. In some embodiments, the constraints/preferences 626 may indicate that adaptive sampling of the training data is to be used. In at least one embodiment the client may indicate a target resource budget or time budget as a constraint for the training, and the MLS may determine whether adaptive sampling should be used during training based on such constraints.

If a decision to use adaptive sampling is made (which may be based on the constraints/preferences, the model type, and/or an examination of at least a portion of the training data), an algorithm similar to Algorithm 1 discussed above may be implemented for the training iterations of the model in the depicted embodiment. In some embodiments, a tree data structure similar to that discussed in the context of Algorithm 2 may be instantiated and used for the training.

When the training phase of the model is complete, a message 640 indicating that the trained model is ready may be transmitted to the client 602. The client may submit model execution requests 650 indicating one or more input records for which predictions are to be generated using the trained version of the model. The results 660 of the model execution may be transmitted to the client 602.

In some embodiments, during the training phase of the model, a training status request 630 may be submitted periodically by the client 602 to the MLS 610. In response, a status update 632 may be provided, indicating for example how many training iterations have been run, and/or the current sampling weights assigned to the different training examples. In at least one embodiment, such updated training status information may be provided using a visualization interface, which may be refreshed automatically.

Provider Network Environment

Figure 7:
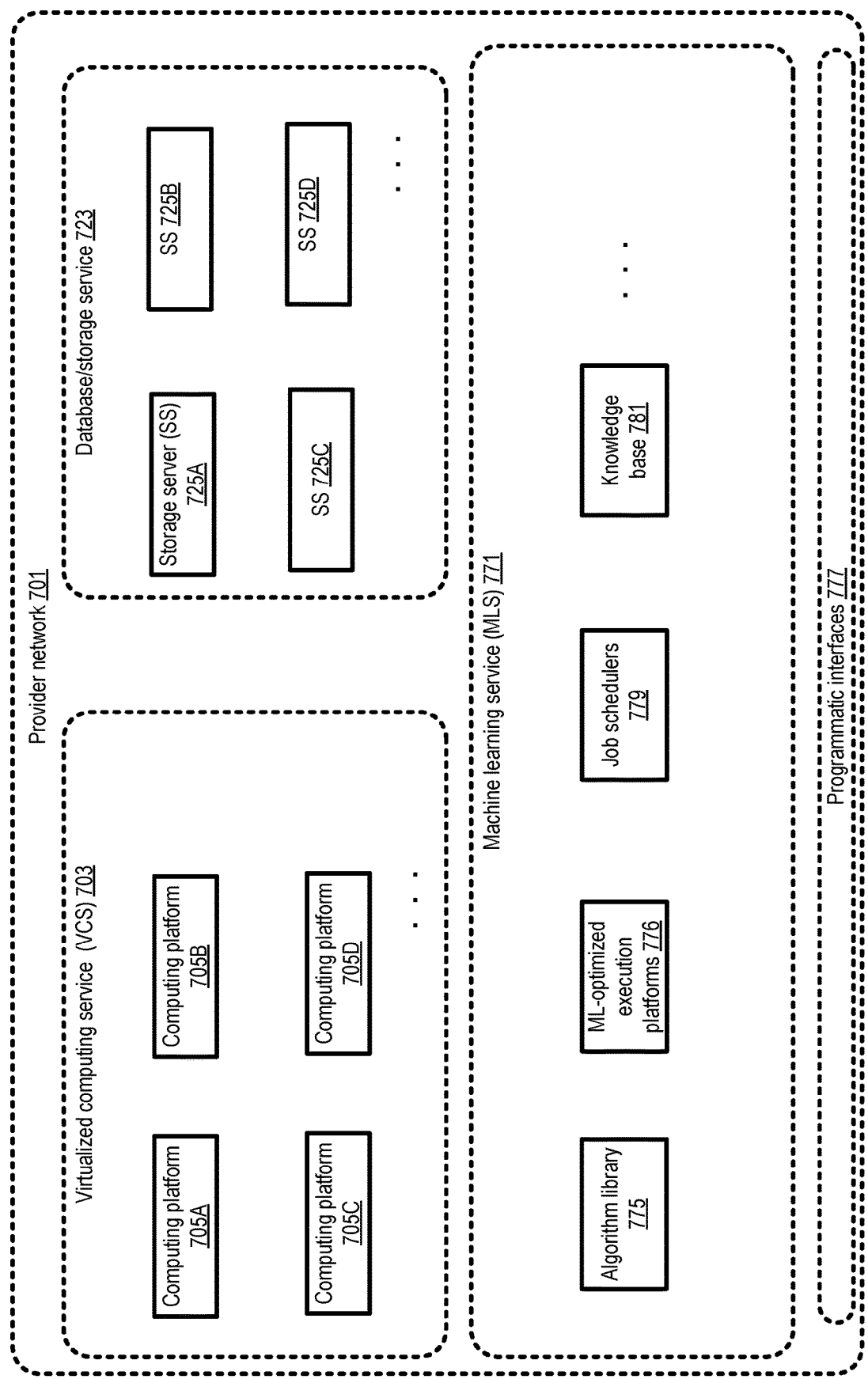
FIG. 7 illustrates a provider network environment at which a machine learning service employing adaptive sampling may be implemented, according to at least some embodiments.

In some embodiments, the techniques discussed above for adaptive sampling of training data may be implemented at a provider network. FIG. 7 illustrates a provider network environment at which a machine learning service employing adaptive sampling may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 701 may comprise resources used to implement a plurality of services, including for example a virtual computing service (VCS) 703, a database or storage service 723, and a machine learning service (MLS) 771. Components of a given service may utilize components of other services in the depicted embodiment—e.g., for some machine learning tasks, a component of the machine learning service 771 may utilize virtual machines implemented at computing platforms such as 705A-705D of the virtualized computing service. Input data, intermediate results, final results and/or other artifacts of various machine learning algorithms or models, such as models using randomized learning algorithms for which adaptive sampling may be employed, may be stored at storage servers 725 (e.g., 725A-725D) of the database or storage service 723 in some embodiments. Individual ones of the services shown in FIG. 7 may implement a respective set of programmatic interfaces 777 which can be used by external and/or internal clients (where the internal clients may comprise components of other services) in the depicted embodiment.

A wide variety of algorithms for machine learning tasks may be available from library 775 in the depicted embodiment. In some embodiments, requests to train some types of machine learning models may be handled as batch jobs at the machine learning service, and a batch job scheduler 779 may orchestrate the allocation of resources for the jobs as well as dependencies among jobs. In the depicted embodiment, entries of a knowledge base 781 of the MLS 771 may be consulted, for example, to select hyperparameter values for adaptive sampling and other algorithms. In at least one embodiment, a machine learning service 771 may have access to or include a set of execution platforms 776 that are optimized for machine learning tasks (e.g., platforms that have customized hardware such as GPU arrays and/or customized software stacks). Depending on the suitability of such platforms for the models being trained using adaptive sampling, one or more execution platforms 776 may be employed for training and/or executing such models in the depicted embodiment.

In at least some embodiments, the techniques discussed earlier for adaptive sampling of training data may be implemented using non-specialized computing platforms of the virtualized computing service 703. In some embodiments, the techniques described above may be implemented without acquiring resources of network-accessible services such as those shown in FIG. 7. For example, a standalone tool implemented at one or more computing devices which are not part of a network-accessible service may be used in some embodiments.

Use Cases

The techniques described above, of using adaptive sampling to select training examples for training iterations of machine learning models may be useful in a variety of scenarios. Iterative randomized learning algorithms such as stochastic gradient descent variants are popular for a wide variety of models, including the neural-network-based deep learning algorithms which are increasingly being employed for numerous problem domains. In many cases, the training data sets for such models may comprise millions of examples, and not all the examples may be equally useful with respect to training the model. As a result of using adaptive sampling, the more "difficult" training examples (examples using which, in effect, the model can improve more quickly) may be prioritized relative to "easy" training examples. As a result, training times and/or model quality may be improved, enabling models to be deployed for production applications at lower overall cost.

Illustrative Computer System

Figure 8:
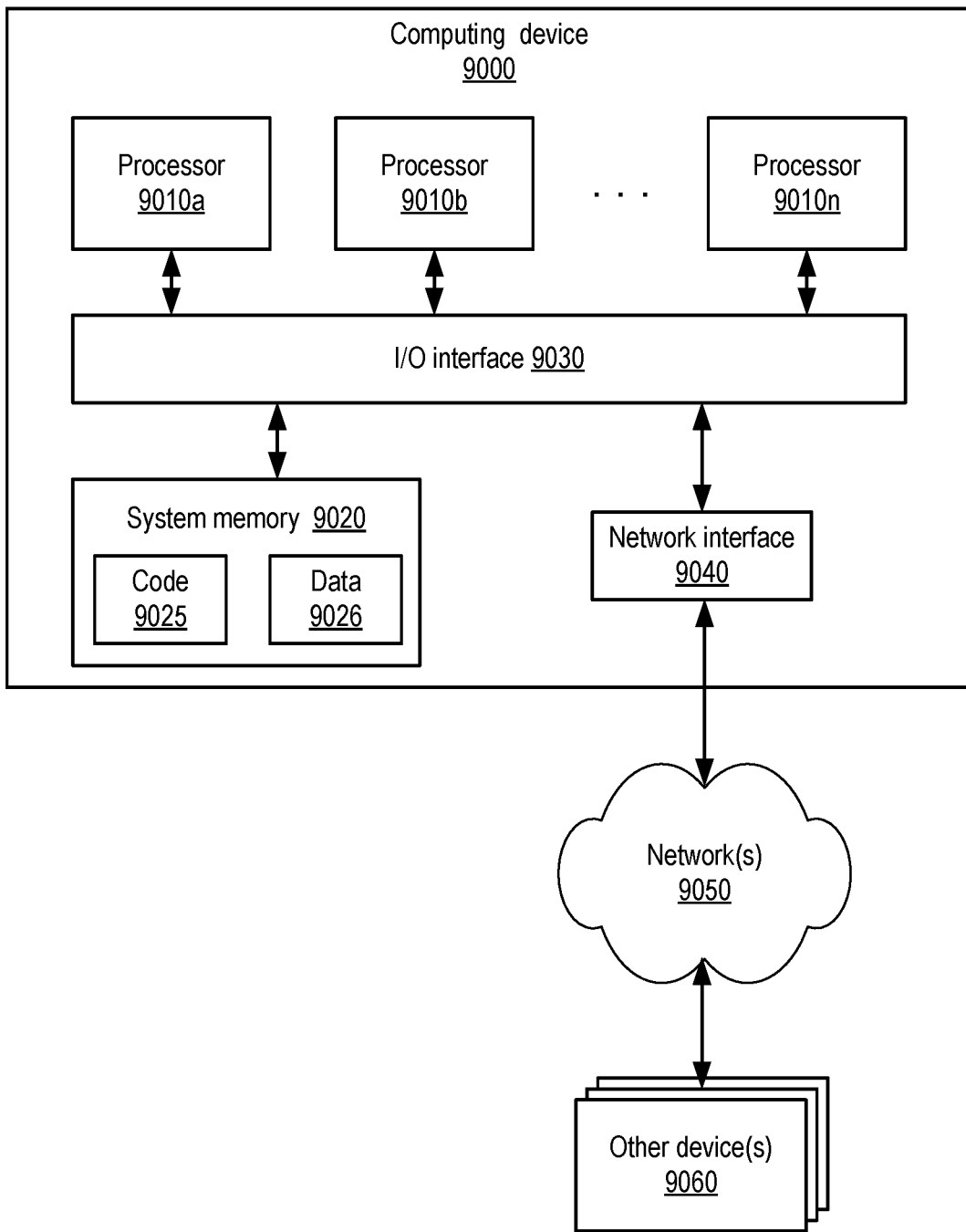
FIG. 8 is a block diagram illustrating an example computing device that may be used in at least some embodiments.

In at least some embodiments, a server that implements a portion or all of one or more of the technologies described herein, including the adaptive sampling algorithms and other aspects of training and executing machine learning models, may include a general-purpose computer system that includes or is configured to access one or more computer-accessible media. FIG. 8 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 7, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 7 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of a machine learning service;
wherein the one or more computing devices are configured to:
obtain an indication of a training data set to be used for a machine learning model, wherein the training data set comprises a plurality of observation records, and wherein a learning algorithm of the machine learning model meets one or more stability criteria associated with determining risk bounds for the learning algorithm using PAC-Bayesian analysis;
determine, based at least in part on an analysis of at least a portion of the training data set, that adaptive sampling is to be used to select observation records in one or more training iterations of the machine learning model;

implement the one or more training iterations, wherein a particular training iteration of the one or more training iterations comprises:

selecting one or more index values based at least in part on a set of sampling weights assigned to the plurality of observation records, wherein the selected one or more index values respectively indicate one or more observation records selected out of the plurality of observation records of the training data set to train the machine learning model in the particular training iteration;

updating a set of parameters of the machine learning model using the learning algorithm, based at least in part on a result, obtained using the machine learning model, with respect to the one or more observation records selected out of the plurality of observation records indicated respectively by the one or more selected index values; and modifying the set of sampling weights assigned to the plurality of observation records based at least in part on a utility function, an amplitude parameter, and a decay parameter, wherein modification of the set of sampling weights updates the selection of one or more index values in a next training iteration such that a probability of selection for at least some of the observation records is changed for the next training iteration, wherein the utility function is related to an objective of the learning algorithm, wherein the amplitude parameter controls aggressiveness of the modification of the set of sampling weights, and wherein the decay parameter decreases an effect of prior modification of the set of sampling weights in a past training iteration; and provide a result obtained from a trained version of the machine learning model with respect to a particular observation record, wherein the particular observation record is not part of the training data set.

2. The system as recited in claim 1, wherein the learning algorithm comprises a stochastic gradient descent algorithm.

3. The system as recited in claim 1, wherein the one or more computing devices are configured to:

determine that a request to train the machine learning model has been received via a programmatic interface of a machine learning service of a provider network.

4. The system as recited in claim 1, wherein selecting the one or more index values comprises traversing a tree data structure, wherein individual ones of leaf nodes of the tree data structure correspond to respective index values.

5. The system as recited in claim 1, wherein a result of the utility function is based at least in part on one or more of: (a) a training iteration count, (b) a current set of parameters of the machine learning model or (c) the one or more observation records indicated respectively by the one or more selected index values.

6. A method, comprising:

performing, by one or more computing devices:

obtaining an indication of a training data set to be used for a machine learning model, wherein the training data set comprises a plurality of observation records, and wherein a learning algorithm of the machine learning model meets one or more stability criteria;

implementing one or more training iterations of the machine learning model using an adaptive input sampling strategy, wherein a particular training iteration of the one or more training iterations comprises:

selecting one or more index values based at least in part on a set of sampling weights assigned to the plurality of observation records, wherein an individual index value of the one or more index values indicates a particular observation record selected out of the training data set to train the machine learning model in the particular training iteration;

updating a set of parameters of the machine learning model using the learning algorithm, based at least in part on a result, obtained using the machine learning model, with respect to one or more observation records indicated respectively by the one or more selected index values; and modifying the set of sampling weights assigned to the plurality of observation records based at least in part on a utility function, an amplitude parameter, and a decay parameter, wherein modification of the set of sampling weights updates the selection of one or more index values in a next training iteration such that a probability of selection for at least some of the observation records is changed for the next training iteration, wherein the utility function is related to an objective of the learning algorithm, wherein the amplitude parameter controls aggressiveness of the modification of the set of sampling weights, and wherein the decay parameter decreases an effect of prior modification of the set of sampling weights in a past training iteration; and providing a result obtained from a trained version of the machine learning model with respect to a particular observation record, wherein the particular observation record is not part of the training data set.

7. The method as recited in claim 6, wherein the learning algorithm comprises a stochastic gradient descent algorithm.

8. The method as recited in claim 6, further comprising performing, by the one or more computing devices:

determining that adaptive sampling is to be used for the one or more iterations based at least in part on an analysis of at least a portion of the training data set.

9. The method as recited in claim 8, wherein the analysis of at least the portion of the training data set comprises one or more of: (a) determining that a distribution of one or more attributes of the observation records meets a skew criterion, or (b) determining that a size of the training data set exceeds a threshold.

10. The method as recited in claim 6, wherein a result of the utility function is based at least in part on one or more of: (a) a training iteration count, (b) a current set of parameters of the machine learning model or (c) the one or more observation records indicated respectively by the one or more selected index values.

11. The method as recited in claim 6, further comprising performing, by the one or more computing devices:

determining that a request to train the machine learning model has been received via a programmatic interface of a machine learning service of a provider network.

12. The method as recited in claim 6, further comprising performing, by the one or more computing devices:

determining that a request to utilize adaptive sampling for the machine learning model has been received via a programmatic interface of a machine learning service of a provider network.

13. The method as recited in claim 6, wherein selecting the one or more index values comprises traversing a tree data structure, wherein individual ones of leaf nodes of the tree data structure correspond to respective index values.

14. The method as recited in claim 13, wherein a particular training iteration of the one or more training iterations comprises one or more of: (a) updating respective labels associated with one or more leaf nodes of the tree data structure and (b) updating respective labels of one or more non-leaf nodes of the tree, wherein the labels on the one or more non-leaf nodes are indicative of traversal probability parameters.

15. The method as recited in claim 6, further comprising performing, by the one or more computing devices:
    selecting, based at least in part on one or more entries of a knowledge base of a machine learning service, one or more of: (a) the utility function, (b) the amplitude parameter, or (c) the decay parameter.

16. A non-transitory computer-accessible storage medium storing program instructions that when executed on one or more processors cause the one or more processors to:
    obtain an indication of a training data set to be used for a machine learning model, wherein the training data set comprises a plurality of observation records;
    implement one or more training iterations of the machine learning model using an adaptive input sampling strategy, wherein a particular training iteration of the one or more training iterations comprises:
        selecting one or more index values based at least in part on a set of sampling weights assigned to the plurality of observation records, wherein an individual index value of the one or more index values indicates a particular observation record selected out of the training data set to train the machine learning model in the particular training iteration;
        updating a set of parameters of the machine learning model using a learning algorithm, based at least in part on a result, obtained using the machine learning model, with respect to one or more observation records indicated respectively by the one or more selected index values; and
        modifying the set of sampling weights assigned to the plurality of observation records based at least in part on a utility function, an amplitude parameter, and a decay parameter, wherein modification of the set of sampling weights updates the selection of one or more index values in a next training iteration such that a probability of selection for at least some of the observation records is changed for the next training iteration, wherein the utility function is related to an objective of the learning algorithm, wherein the amplitude parameter controls aggressiveness of the modification of the set of sampling weights, and wherein the decay parameter decreases an effect of prior modification of the set of sampling weights in a past training iteration; and
    provide a result obtained from a trained version of the machine learning model.

17. The non-transitory computer-accessible storage medium as recited in claim 16, wherein the learning algorithm comprises a stochastic gradient descent algorithm.

18. The non-transitory computer-accessible storage medium as recited in claim 16, wherein the instructions when executed on the one or more processors cause the one or more processors to:
    determine that adaptive sampling is to be used for the one or more iterations based at least in part on an analysis of at least a portion of the training data set.

19. The non-transitory computer-accessible storage medium as recited in claim 16, wherein the instructions when executed on the one or more processors cause the one or more processors to:
    determining that a request to train the machine learning model has been received via a programmatic interface of a machine learning service of a provider network.

20. The non-transitory computer-accessible storage medium as recited in claim 16, wherein selecting the one or more index values comprises traversing a tree data structure, wherein individual ones of leaf nodes of the tree data structure correspond to respective index values.

\* \* \* \* \*